United States Patent
Forthoffer et al.

(10) Patent No.: US 10,460,533 B2
(45) Date of Patent: Oct. 29, 2019

(54) MOBILE TELEMETRY SYSTEM

(71) Applicant: Ford Global Technologies, LLC, Dearborn, MI (US)

(72) Inventors: Daniel William Forthoffer, Grosse Pointe Woods, MI (US); Medville Jay Throop, Ann Arbor, MI (US); Brian David Tillman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 15/663,314

(22) Filed: Jul. 28, 2017

(65) Prior Publication Data

US 2017/0330393 A1 Nov. 16, 2017

Related U.S. Application Data

(62) Division of application No. 12/755,030, filed on Apr. 6, 2010, now Pat. No. 9,721,398.

(51) Int. Cl.
*G07C 5/00* (2006.01)
*B60R 25/00* (2013.01)
*H04W 4/00* (2018.01)
*H04W 4/04* (2009.01)

(52) U.S. Cl.
CPC .............. *G07C 5/008* (2013.01); *B60R 25/00* (2013.01); *H04W 4/04* (2013.01)

(58) Field of Classification Search
CPC .......... B60R 25/00; H04W 4/00; H04W 4/04; G07C 5/00; G07C 5/008; G06F 17/00; G08C 17/00
See application file for complete search history.

(56) References Cited

U.S. PATENT DOCUMENTS

| | | | |
|---|---|---|---|
| 6,430,485 B1 | 8/2002 | Hullinger | |
| 6,636,790 B1 | 10/2003 | Lightner et al. | |
| 6,732,031 B1 | 5/2004 | Lightner et al. | |
| 9,053,591 B2 * | 6/2015 | Phelan | G06Q 40/00 |
| 9,637,134 B2 * | 5/2017 | Phelan | G06Q 40/00 |
| 9,721,398 B2 * | 8/2017 | Forthoffer | B60R 25/00 |
| 10,124,808 B2 * | 11/2018 | Phelan | G06Q 40/00 |
| 10,144,389 B2 * | 12/2018 | Archer | A62C 27/00 |
| 2007/0083304 A1 | 4/2007 | Yamada | |
| 2008/0167758 A1 | 7/2008 | Louch et al. | |
| 2009/0262714 A1 | 10/2009 | Lim et al. | |
| 2009/0265633 A1 | 10/2009 | Lim et al. | |

FOREIGN PATENT DOCUMENTS

GB 2434884 B 8/2009

* cited by examiner

*Primary Examiner* — Yonel Beaulieu
(74) *Attorney, Agent, or Firm* — David B. Kelley; Brooks Kushman P.C.

(57) ABSTRACT

An automotive vehicle may include a processor configured to buffer records of vehicle information created at a scheduled acquisition rate, and to buffer event files of vehicle information created upon the occurrence of predetermined triggering events. The processor may be further configured to cause the buffered records to be wirelessly transmitted on a last-in first-out basis if a signal strength in a vicinity of the vehicle is greater than a first predetermined threshold, and to cause the buffered files to be wirelessly transmitted if the signal strength is greater than a second predetermined threshold.

8 Claims, 2 Drawing Sheets

MOBILE TELEMETRY SYSTEM

CROSS-REFERENCE TO RELATED APPLICATION

This application is a divisional of application Ser. No. 12/755,030, filed Apr. 6, 2010, now U.S. Pat. No. 9,721,398, the disclosure of which is hereby incorporated in its entirety by reference herein.

STATEMENT REGARDING FEDERALLY SPONSORED RESEARCH OR DEVELOPMENT

The invention was made with Government support under Contract No. DE-FC26-08NT04384. The Government has certain rights to the invention.

BACKGROUND

The advent of battery electric and hybrid electric automotive technology has presented challenges for automotive manufacturers and suppliers attempting to understand the nuances involved with the operation of these vehicles. For example, control algorithms that account for vehicle drivability and chargeability in a multitude of environmental conditions may need to be developed. In order for engineers to construct and implement these control algorithms, however, vehicle data may need to be collected and analyzed.

SUMMARY

A vehicle may include a processor configured to buffer collected vehicle information and to cause the buffered information to be wirelessly transmitted if a wireless signal strength in a vicinity of the vehicle is greater than a first predetermined threshold. The processor may be further configured to archive the buffered information if the signal strength is less than or equal to the first predetermined threshold.

DETAILED DESCRIPTION

Figure 1:
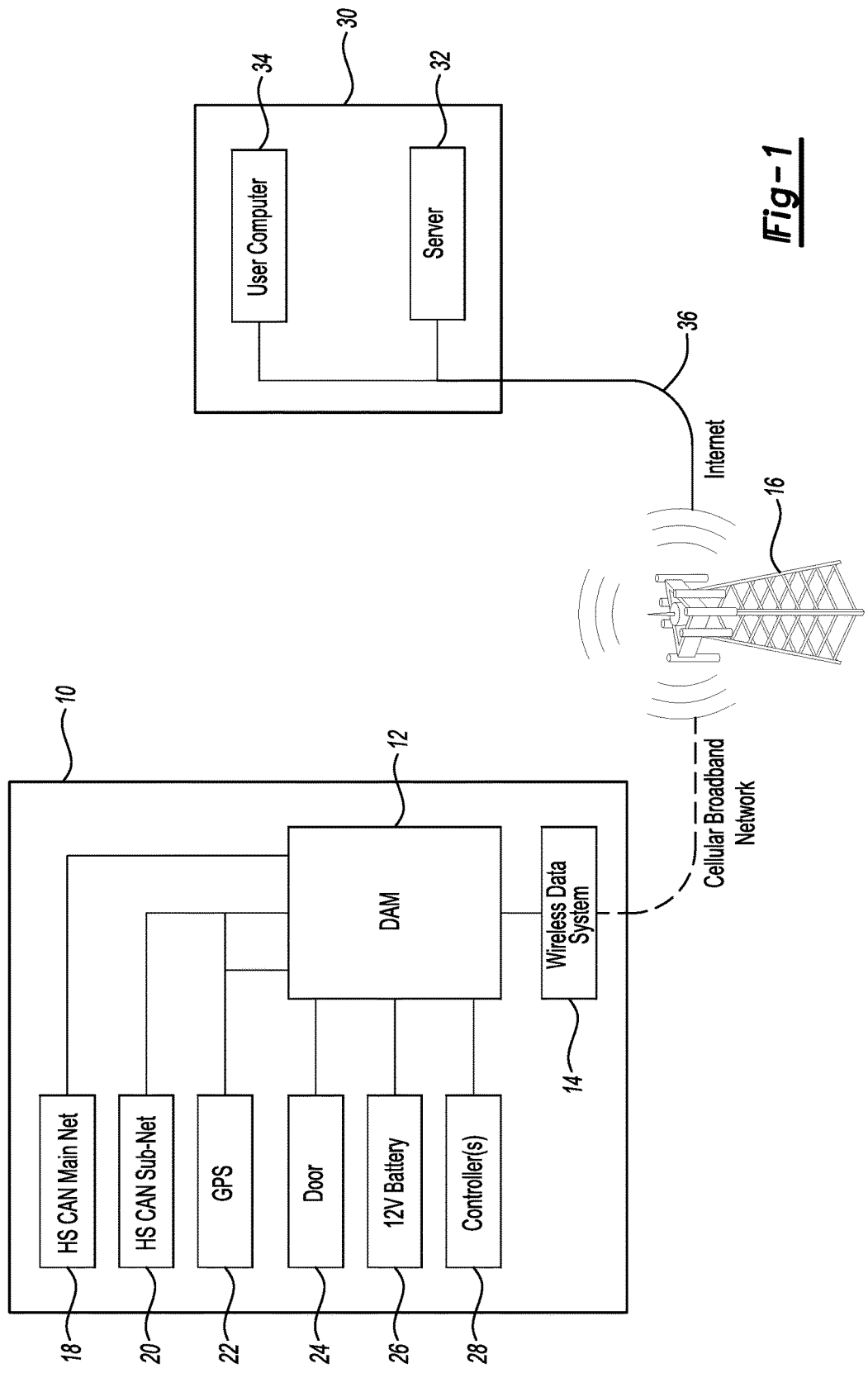
FIG. 1 is a block diagram of an embodiment of a mobile telemetry system.

The real-time transmission of collected vehicle data via a cellular broadband (or other wireless) network may be periodically interrupted as the vehicle travels into and out of cellular broadband coverage areas. As an example, only portions of a specified vehicle test route may fall within areas having cellular broadband service. As the vehicle travels into a non-covered area, any vehicle data collected in this non-covered area will be unable to be transmitted. Once the vehicle reenters a covered area, the real-time transmission of collected vehicle data may resume. The data collected in the non-covered area, however, may also need to be transmitted. Bandwidth and/or signal strength constraints may limit and/or restrict the real-time transmission of collected vehicle data and the transmission of buffered and/or archived data collected in a non-covered area.

Embodiments disclosed herein may provide mobile telemetry systems configured to collect and transmit vehicle related data via wireless transmission techniques (e.g., cellular broadband, wi-fi, wi-max, satellite, etc.) Certain systems may detect the extent to which wireless transmission services are available. These systems may then transmit the collected vehicle related data based on the extent to which wireless transmission services are available. As an example, collected data may be wirelessly transmitted on a last-in first-out basis provided some minimal signal strength is available. Collected data may be archived and/or stored otherwise.

Other systems may collect different types of vehicle related data and handle the transmission of these different types of data differently. As an example, certain vehicle information may be collected continuously (e.g., once a second, once every two seconds, etc.) while other vehicle information may be collected upon the occurrence of a predetermined event. The continuously collected information (or trickle information) may be transmitted based on whichever information was most recently collected if the signal strength is greater than some minimum threshold. The information collected upon the occurrence of an event (or event information) may be transmitted if the signal strength is greater than another threshold.

These thresholds may depend on a size of the information to be transmitted: the smaller the size of the information to be transmitted, for example, the lower the threshold; the larger the size of the information to be transmitted, the higher the threshold.

Several signal strength thresholds may be employed in some embodiments. A minimum threshold, for example, may be established above which trickle information is transmitted. A second threshold may be established above which event information is transmitted. A third threshold may be established above which archived event information is transmitted. A fourth threshold may be established above which archived trickle information is transmitted. In this example, the second threshold is greater than the minimum threshold, the third threshold is greater than the second threshold, etc. Other arrangements and scenarios are also possible.

Referring to FIG. 1, an embodiment of an automotive vehicle 10 may include a data acquisition module (DAM) 12 operatively arranged with a wireless data system 14. In this embodiment, the data system 14 includes a modem and a cellular transceiver. Thus, the data system 14 may transmit information, in a known fashion, from the DAM 12 to a cellular antenna 16. In other embodiments, the data system 14 may include known and/or suitable modules to send and/or receive information via wi-fi, wi-max, satellite, etc.

The vehicle 10 may also include a high-speed controller area network (CAN) main network 18, a high-speed CAN sub-network 20, a navigation system 22, a door 24, an auxiliary battery 26 and a controller(s) 28. Information from and/or about these systems may be observed and/or collected by the DAM 12. As a result, the DAM 12 may receive information such as vehicle speed, battery temperature, coolant temperature, battery state of charge and/or other vehicle information from the networks 18, 20 and/or other inputs. The DAM 12 may further receive geographic position data from the navigation system 22, information as to whether the door 24 is open, and information whether other components and/or modules are powered up within the vehicle 10 from the controller(s) 28. Other arrangements are, of course, also possible.

The DAM 12, in this embodiment, may collect certain information (trickle information) at a specified rate. That is, the DAM 12 observes certain vehicle related parameters during a time period of, for example, one second, and at the conclusion of this time period, the DAM 12 buffers in a record a minimum, maximum, and mean value (if available) for each of the parameters. Thus, the rate of data acquisition in this example is once a second. Any suitable rate, however, may be used.

During a next time period (e.g., the next one second), the DAM 12 again observes the vehicle related parameters, and at the conclusion of this time period, the DAM 12 buffers any changes in the minimum, maximum, and mean value for each of the parameters. As an example, if at the conclusion of time t=1, the minimum, maximum, and mean are 0.5, 1.5 and 1 respectively, the DAM 12 buffers a minimum of 0.5, a maximum of 1.5, and a mean of 1. If at the conclusion of time t=2, the minimum, maximum, and mean are 0.4, 1.6, and 1 respectively, the DAM 12 buffers a minimum of 0.4, a maximum of 1.6, and a mean of null. This allows for less data to be needed during the transmission portion of the process. The above may continue for any specified duration.

The DAM 12 may also collect certain information (event information) upon the occurrence of specified and/or predetermined events. These specified and/or predetermined events may include a specified parameter exceeding a predetermined threshold value (e.g., a coolant temperature exceeding 30° C., vehicle speed exceeding 70 m.p.h., etc.), vehicle events such as vehicle startup and/or shutdown, etc.

Event information may include any information available to the DAM 12 and may be buffered as files on a per event basis. The event information, however, may be collected at a higher resolution than the trickle information. For example, event information may be collected over a timescale of 1 ms whereas, as discussed above, the trickle information may be collected over a timescale of 1 s. Of course, any suitable technique and or scheme for collecting information may be used.

As explained above, the vehicle 10 may travel into and out of areas serviced by the cellular antenna 16. As known in the art, the data system 14 (e.g., the modem portion of the data system 14) may detect a wireless signal strength associated with a wireless signal received by the data system 14. The DAM 12 may use this signal strength information to determine whether it is within an area serviced by the cellular antenna 16. If the signal strength is 0, for example, the DAM 12 may determine that the vehicle 10 is in an area not serviced by the cellular antenna 16. In such non-covered areas, the DAM 12 may archive buffered records into message files and archive any buffered event files. If the signal strength is greater than 0, the DAM 12 may determine that the vehicle 10 is in an area serviced by the cellular antenna 16. The DAM 12, in such covered areas, may cause buffered records to be transmitted via the data system 14 on a last-in first-out basis. The transmission of buffered event files and/or archived files will be discussed in more detail below.

The rate at which the DAM 12 causes the data system 14 (e.g., the antenna portion of the data system 14) to transmit buffered records may be at least equal to the trickle data acquisition rate. The trickle data acquisition rate, using the example above, is once a second. Thus, the DAM 12 may cause the data system 14 to transmit buffered records at least at a rate of once a second. Other transmission rates, however, may also be used.

Figure 2:
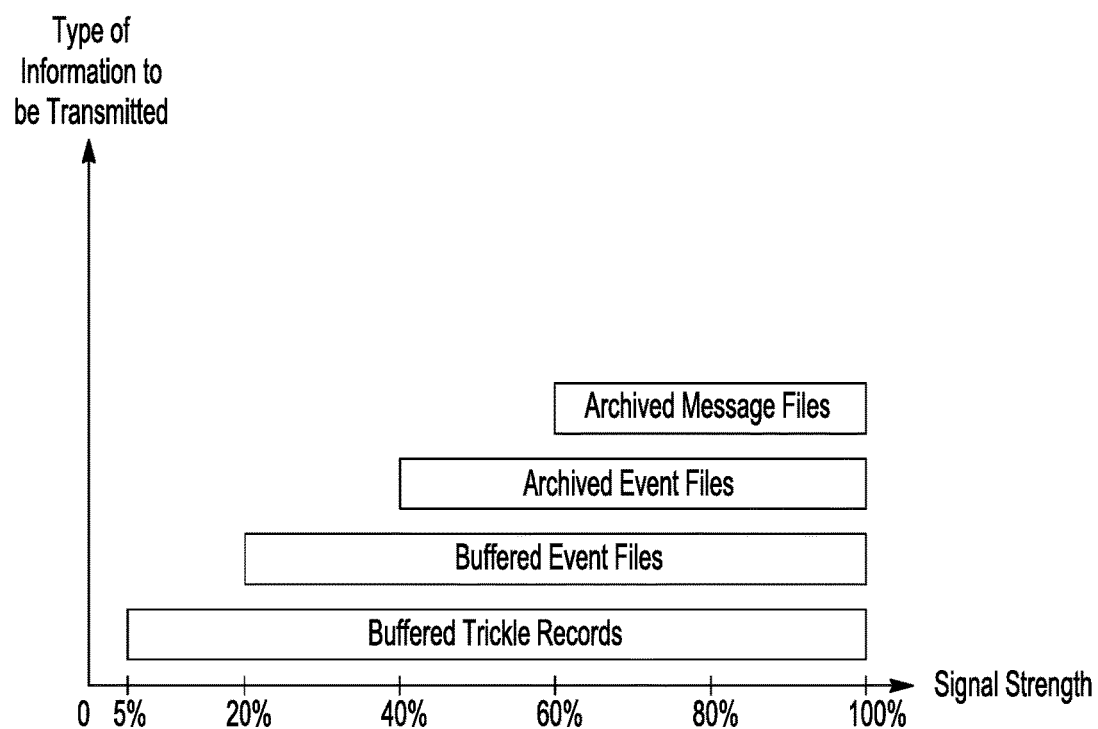
FIG. 2 is an example plot of wireless signal strength versus type of information to be transmitted.

Referring to FIGS. 1 and 2, the type of information transmitted may depend on the signal strength detected by the data system 14. For example, buffered trickle records may be transmitted as long as the signal strength is greater than some minimal threshold (e.g., 5%). Buffered event files may be transmitted as long as the signal strength is greater than a higher threshold (e.g., 20%). Archived event files may be transmitted as long as the signal strength is greater than a still higher threshold (e.g., 40%). Archived message files may be transmitted as long as the signal strength is greater than a highest threshold (e.g., 60%).

This scheme may be implemented by the DAM 12 in an attempt to transmit the most recent trickle information on a near real-time basis. Other thresholds and/or types of information to be transmitted therewith, however, may be used as desired. As an example, certain of the thresholds may depend on the size of the files to be transmitted. The example above lists a 40% signal strength threshold in order for archived event files to be transmitted. The DAM 12, however, may lower this threshold (or select a lower threshold) if the archived event files to be transmitted have a size that is less than some threshold size. Likewise, the DAM 12 may raise this threshold (or select a higher threshold) if the archived event files to be transmitted have a size that is greater than some threshold size, etc. The thresholds associated with the other information types may be similarly treated.

Referring again to FIG. 1, a location 30 remote from the vehicle 10 may include a server 32 and a user computer 34 configured to access information on the server 32. The server 32 may be configured in a known fashion to obtain via the Internet 36 information received by the cellular antenna 16. The server 32 may be further configured in a known fashion to cause a confirmation signal to be transmitted via the cellular antenna 16 for reception by the data system 14 for any records and/or files transmitted by the data system 14 and received at the server 32. That is, if the data system 14 transmits a particular file to the cellular antenna 16 and the server 32 receives that particular file, the server 32 will cause a confirmation signal to be transmitted via the cellular antenna 16 indicating that the server 32 received the particular file.

The DAM 12, in certain embodiments, may cause any buffered records and/or files, and/or any archived files to be deleted once a confirmation signal has been received indicating that the record(s) and/or file(s) to be deleted have been received at the server 32.

As apparent to those of ordinary skill, the buffered files and archived files may each have a size associated with them. Some archived message files, for example, may be larger than others. Some buffered event files may be smaller than others, etc. Referring again to FIG. 1, the DAM 12 may cause files, whether buffered or archived, to be transmitted by the data system 14 according to the file sizes (e.g., smallest to largest). That is, provided the signal strength is such that buffered event files may be transmitted, the smallest buffered event files will be transmitted first. Likewise, the smallest archived event files will be transmitted first provided the signal strength is such that archived event files may be transmitted.

The algorithms disclosed herein, as apparent to those of ordinary skill, may be deliverable to a processing device, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, SD Cards and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed is:

1. A mobile telemetry system comprising:
a vehicle including a processor configured to
buffer vehicle information collected at a scheduled rate,
cause the buffered information to be wirelessly transmitted responsive to a wireless signal strength in a vicinity of the vehicle being greater than a first predetermined threshold, and
archive the buffered information responsive to the signal strength being less than or equal to the first predetermined threshold.

2. The system of claim 1, wherein the processor is further configured to cause the archived information to be wirelessly transmitted responsive to the signal strength being greater than a second predetermined threshold.

3. The system of claim 2, wherein the processor is further configured to archive the buffered information as files, each file having a size, and to cause the archived files to be wirelessly transmitted based on the sizes.

4. The system of claim 2, wherein the processor is further configured to archive the buffered information as files each having a size and wherein the second predetermined threshold depends on the sizes.

5. A mobile telemetry system comprising:
a vehicle including a processor configured to
buffer files of vehicle information created upon occurrence of predetermined triggering events,
cause the buffered files to be wirelessly transmitted responsive to a wireless signal strength in a vicinity of the vehicle being greater than a first predetermined threshold, and
archive the buffered files responsive to the signal strength being less than or equal to the first predetermined threshold.

6. The system of claim 5, wherein the processor is further configured to cause the archived files to be wirelessly transmitted responsive to the signal strength being greater than a second predetermined threshold.

7. The system of claim 5, wherein each of the buffered files has a size and wherein the processor is further configured to cause the buffered files to be wirelessly transmitted based on the sizes.

8. The system of claim 5, wherein each of the buffered files has a size and wherein the first predetermined threshold depends on the sizes.

* * * * *